(12) United States Patent
Chen

(10) Patent No.: US 7,031,083 B2
(45) Date of Patent: Apr. 18, 2006

(54) DIGITAL CAMERA MODULE WITH ANTI-FOULING LENS ADHESION

(75) Inventor: Ga-Lane Chen, Fremont, CA (US)

(73) Assignee: Hon Hai Precision Industry Co., Ltd., (TW)

( * ) Notice: Subject to any disclaimer, the term of this patent is extended or adjusted under 35 U.S.C. 154(b) by 0 days.

(21) Appl. No.: 10/991,319

(22) Filed: Nov. 17, 2004

(65) Prior Publication Data

US 2005/0195503 A1  Sep. 8, 2005

(30) Foreign Application Priority Data

Mar. 5, 2004  (CN) ........................ 2004100264307

(51) Int. Cl.
*G02B 7/02* (2006.01)

(52) U.S. Cl. ........................ 359/819; 359/820; 359/821
(58) Field of Classification Search ................ 359/819, 359/821, 820, 826, 808
See application file for complete search history.

(56) References Cited

U.S. PATENT DOCUMENTS

| 5,997,974 | A  | * | 12/1999 | Schlueter et al. ............. 428/58 |
| 6,663,957 | B1 | * | 12/2003 | Takushima et al. ..... 428/355 R |
| 2002/0141080 | A1 | * | 10/2002 | Onda ........................ 359/821 |
| 2004/0161750 | A1 | * | 8/2004 | Sun et al. ...................... 435/6 |
| 2004/0189862 | A1 | * | 9/2004 | Gustavsson et al. ........ 348/376 |
| 2004/0240004 | A1 | * | 12/2004 | Ching ........................ 358/513 |

* cited by examiner

*Primary Examiner*—Timothy Thompson
*Assistant Examiner*—Jerry Fang
(74) *Attorney, Agent, or Firm*—Morris, Manning & Martin, LLP; Tim Tingkang Xia, Esq.

(57) ABSTRACT

A digital camera module (10) for a portable electronic device includes a barrel (12) containing a first lens (122) and a second lens (124), a holder (15) containing part of the barrel, and an image sensor (141) below the first and second lenses. The first and second lenses are adhered in the barrel by an ultraviolet (UV) adhesive. The UV adhesive is cured between 75° Celsius and 100° Celsius for 20 to 30 minutes, and is volatilized little. The image sensor is packaged with a Ceramic Leaded Chip Carrier. The structure of the digital camera module can effectively protect the first and second lenses thereof from moisture, dampness, and oxidation.

19 Claims, 1 Drawing Sheet

DIGITAL CAMERA MODULE WITH ANTI-FOULING LENS ADHESION

BACKGROUND OF THE INVENTION

1. Field of the Invention

The present invention generally relates to digital camera modules, and more particularly to a digital camera module which is used in portable electronic devices such as digital cameras and video cameras.

2. Prior Art

Currently, digital camera modules are in widespread use in a variety of portable electronic devices. Most portable electronic devices are becoming progressively more miniaturized over time, and digital camera modules are correspondingly becoming smaller and smaller. For example, digital camera modules are now widely available as a feature of a mobile phone. Nevertheless, in spite of the small size of a contemporary digital camera module, consumers still demand excellent imaging. The quality of the image provided is mainly dependent upon the optical elements of the digital camera module.

A contemporary digital camera module generally includes a holder, a barrel, several lenses, and an image sensor underlying the lenses. The lenses are adhered in the barrel. The image sensor is packaged by a Plastic Leaded Chip Carrier (PLCC), and is electronically connected with a Printed Circuit Board (PCB). During the process of applying and solidifying the adhesive, it is easily volatilized. The volatilized adhesive is then liable to solidify on surfaces of the lenses. The light transmittance ratio of the lenses is reduced, and the image obtained by the image sensor is impaired. Additionally, the technology of PLCC packaging is complex and expensive, and a PLCC package generally has poor damp proofing, antisepsis, and anti-oxidation characteristics. Furthermore, some of the lenses may be coated with a magnesium fluoride ($MgF_2$) film. The $MgF_2$ film easily absorbs moisture, and generally has poor antisepsis characteristics.

Therefore, a digital camera module that can help overcome the above-described problems and improve image quality is desired.

SUMMARY OF THE INVENTION

Accordingly, an object of the present invention is to provide a digital camera module which can help prevent fouling of lenses thereof and improve image quality.

To achieve the above-mentioned object, a preferred digital camera module for a portable electronic device includes a barrel containing a first lens and a second lens, a holder containing part of the barrel, and an image sensor below the first and second lenses. The first and second lenses are adhered in the barrel by an ultraviolet (UV) adhesive. The UV adhesive is cured between 75° Celsius and 100° Celsius for 20 to 30 minutes, and is volatilized little. The image sensor is packaged with a Ceramic Leaded Chip Carrier. The structure of the digital camera module can effectively protect the first and second lenses thereof from moisture, dampness, and oxidation.

Other objects, advantages and novel features of the invention will become more apparent from the following detailed description when taken in conjunction with the accompanying drawings, in which:

DETAILED DESCRIPTION OF THE INVENTION

Figure 1:
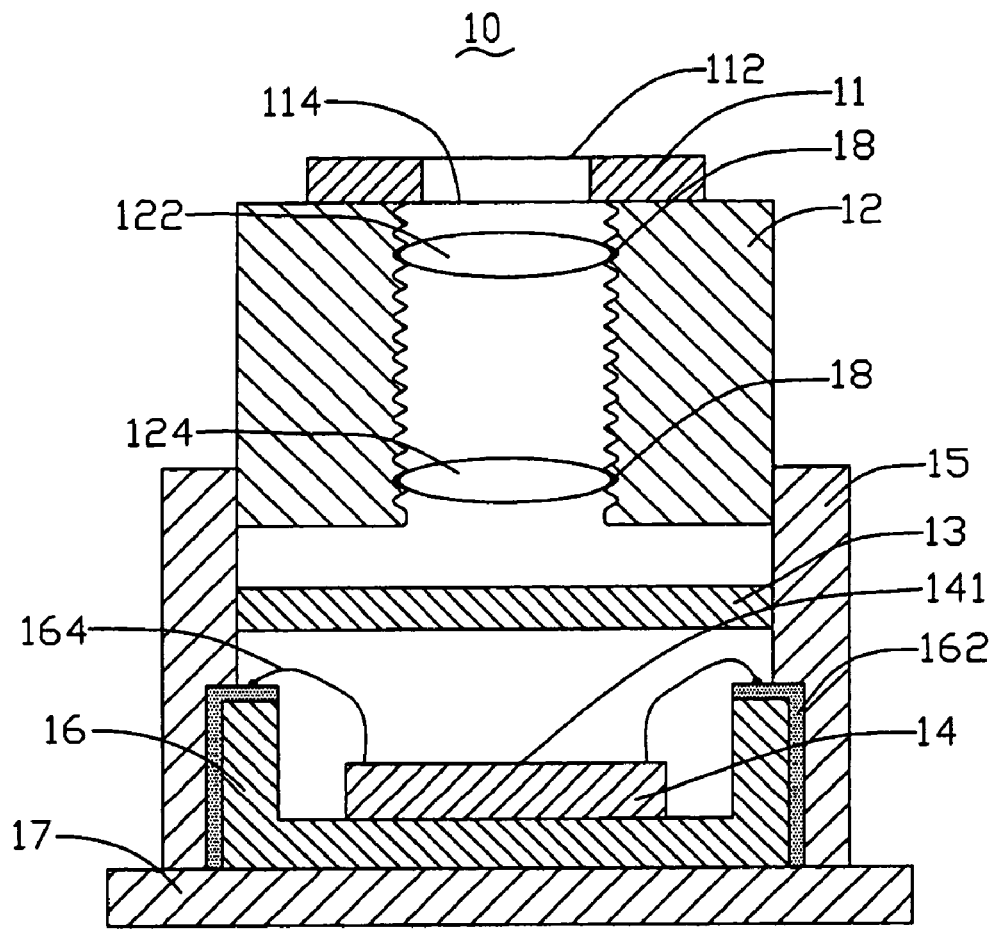
FIG. 1 is a schematic, cross-sectional view of a digital camera module in accordance with the preferred embodiment of the present invention, the digital camera module including a first lens and a second lens.

Referring to FIG. 1, an image pick-up module like a digital camera module 10 includes a cover 11, a barrel 12 as a lens receiver, a first lens 122, a second lens 124, a glass plate 13, a packaged image sensor 14 and a holder 15. The image sensor 14 includes an imaging surface 141, and is packaged on a Flexible Printed Circuit Board (FPC) 17 via a Ceramic Leaded Chip Carrier (CLCC) 16. Part of the barrel 12 is inserted into and engaged in the holder 15. Both the first lens 122 and the second lens 124 are contained in the barrel 12.

The cover 11 is circular, and is fixed on a top of the barrel 12. The cover 11 defines two opposite central openings 112, 114 at two opposite sides thereof. Therefore incident light can penetrate the cover 11, transmit to the first lens 122, and then to the second lens 124. A proofing lens (not shown) can also be provided between the opening 112 and the opening 114, to protect the digital camera module 10 against dust and contamination.

Figure 2:
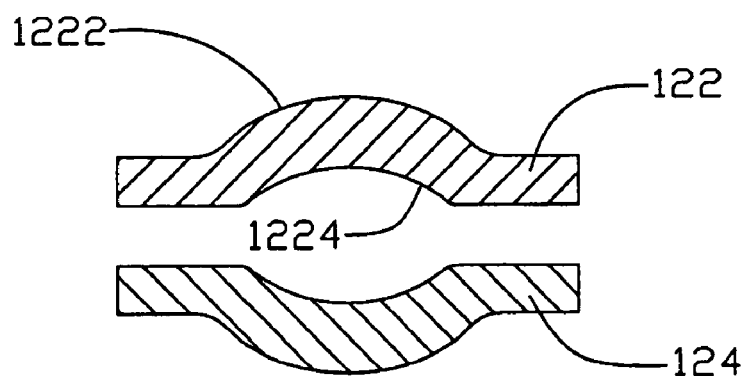
FIG. 2 is an enlarged, cross-sectional view of the first lens and the second lens of the digital camera module of FIG. 1, but showing the first and second lenses in close proximity to each other.

Referring also to FIG. 2, the first lens 122 and the second lens 124 are both used to focus the incident light. The first lens 122 and the second lens 124 are adhered in the barrel 12 by the adhesive 18 at each periphery of the first lens 122 and the second lens 124 which has a significantly small area and is placed in a threaded inner surface of the barrel 12. In the preferred embodiment of the invention, the adhesive 18 is OPTOCAST 3410, which is a kind of ultraviolet (UV) adhesive produced by Electronic Material Inc. (EMI) of Britain. After the adhesive 18 is applied, the lenses 112, 114 are baked twice. In the first baking, the temperature is held between 75° Celsius and 85° Celsius for 20 to 30 minutes. In the second baking, the temperature is held between 90° Celsius and 100° Celsius for 20 to 30 minutes. Throughout both baking processes, the adhesive 18 is volatilized little.

The first lens 122 has an outwardly protruding sub-hemispherical central portion, which defines two aspheric surfaces 1222 and 1224. The aspheric surface 1222 protrudes outwardly. The aspheric surface 1222 is made of glass, so that it can resist dampness, high temperatures, and abrasion. The first lens 122 is alternatively coated to turn from a hydrophilic condition of glass to a hydrophobic condition. The second lens 124 is similar in shape but symmetrically opposite to the first lens 122. The second lens 124 is made of an optical plastic, which can be acrylic resin, polymethyl methacrylate (PMMA), or polycarbonate (PC).

Additionally, a film of AR-Coating (antireflective coating) can be provided on the aspheric surface 1222 of the first lens 122. The AR-Coating comprises alternately stacked layers of silicon dioxide ($SiO_2$) and tantalum pentoxide ($Ta_2O_5$). Therefore, the light transmittance ratio of the first lens 122 is increased, and the reflectivity of the first lens 122 is decreased. Furthermore, a film of IR-Cut Coating can be provided on the aspheric surface 1224 of the first lens 122.

This film can prevent incident infrared light rays from reaching the image sensor 14.

The glass plate 13 is contained and fixed in the holder 15 between the barrel 12 and the image sensor 14, and is for protecting the imaging surface 141 of the image sensor 14. The image sensor 14 can be a Complementary Metal-Oxide Semiconductor (CMOS) type sensor or a Charge Coupled Device (CCD). A plurality of wires 164 connects the image sensor 14 with a hollow, cylindrical leading-out terminal 162, which in turn is adapted to be electrically connected with the FPC 17. The image sensor 14 can thus convey electrical signals to the FPC 17. The holder 15 is a hollow cylinder, and defines two opposite openings (not labeled). A top one of the openings has said part of the barrel 12 engaged therein, and the other bottom opening has the image sensor 14 and the CLCC 16 received therein.

In assembly, the glass plate 13 is inserted into and fixed in the holder 15. The image sensor 14 attached on the CLCC 16 is inserted into the holder 15 through the bottom opening thereof, and fixed in the holder 15. The first lens 122 and the second lens 124 are inserted into and fixed in the barrel 12. Said part of the barrel 12 is inserted into and engaged in the holder 15. Finally, the cover 11 is fixed on the top of the barrel 12. The structure of the digital camera module 10 of the present invention can effectively protect the first and second lenses 122, 124 thereof from moisture, dampness, and oxidation.

It is believed that the present invention and its advantages will be understood from the foregoing description, and it will be apparent that various changes may be made thereto without departing from the spirit and scope of the invention or sacrificing all of its material advantages. The examples hereinbefore described are merely preferred or exemplary embodiments of the invention.

I claim:

1. A camera module for a portable electronic device, comprising:
   a barrel;
   a first lens adhered in the barrel by an ultraviolet (UV) adhesive, the UV adhesive cured between 75° Celsius and 100° Celsius for 20 to 30 minutes whereby the UV adhesive is volatilized little;
   a holder retaining part of the barrel; and
   an image sensor below the first lens, the image sensor being packaged with a Ceramic Leaded Chip Carrier.

2. The camera module as claimed in claim 1, further comprising a second lens adhered in the barrel below the first lens by the UV adhesive, the UV adhesive cured between 75° Celsius and 100° Celsius for 20 to 30 minutes whereby the UV adhesive is volatilized little.

3. The camera module as claimed in claim 2, wherein the first lens is an aspheric glass lens.

4. The camera module as claimed in claim 3, wherein the second lens is an aspheric plastic lens, and is symmetrically opposite to the first lens.

5. The camera module as claimed in claims 2, wherein the first lens comprises an AR-Coating provided thereon.

6. The camera module as claimed in claim 5, wherein said AR-Coating comprises alternately stacked layers of silicon dioxide ($SiO_2$) and tantalum pentoxide ($Ta_2O_5$).

7. The camera module as claimed in claim 5, wherein the first lens comprises an IR-Cut Coating provided thereon.

8. The camera module as claimed in claim 7, further comprising a glass plate fixed in the holder between the barrel and the image sensor.

9. The camera module as claimed in claim 7, further comprising a cover fixed on a top of the barrel.

10. The camera module as claimed in claim 1, wherein the image sensor is a Complementary Metal-Oxide Semiconductor type sensor or a Charge Coupled Device.

11. An image pick-up module for a portable electronic device, comprising:
    a lens receiver used to receive at least one lens therein and allow incident light to pass through said at least one lens;
    an adhesive for attaching said at least one lens to said lens receiver and having said at least one lens fixed therein, said adhesive applied to a periphery of said at least one lens with a significantly small area, and having a property of slow volatilization; and
    an image sensor spaced from said lens receiver for accepting illumination of said incident light passing through said at least one lens and generating image signals corresponding to said incident light.

12. The image pick-up module as claimed in claim 11, wherein said adhesive is an ultraviolet (UV) adhesive, and is treated by UV illumination and cured in a predetermined temperature range for a predetermined curing period so as to fix said at least one lens to said lens receiver.

13. The image pick-up module as claimed in claim 11, wherein said at least one lens is coated so as to turn from a hydrophilic condition to a hydrophobic condition.

14. The image pick-up module as claimed in claim 11, wherein said at least one lens has an antireflective coating thereon.

15. The image pick-up module as claimed in claim 11, wherein said image sensor is packaged with a Ceramic Leaded Chip Carrier.

16. A method for installing an image pick-up module of a portable electronic device and enhancing performance thereof, comprising the steps of:
    providing a lens receiver having a path therein for incident light to pass along;
    fixing at least one lens interferingly in said path and to said lens receiver with a slowly volatilizing adhesive by applying a predetermined treatment on said adhesive; and
    installing an image sensor spaced from said lens receiver for accepting illumination of said incident light and generating image signals corresponding to said incident light.

17. The method as claimed in claim 16, further comprising the step of coating said at least one lens so as to turn said at least one lens from a hydrophilic condition to a hydrophobic condition.

18. The method as claimed in claim 16, wherein said predetermined treatment includes applying ultraviolet (UV) light on said adhesive and curing said adhesive in a temperature range of between 75° Celsius and 100° Celsius for 20 to 30 minutes.

19. The method as claimed in claim 16, wherein said image sensor is packaged with a Ceramic Leaded Chip Carrier.

* * * * *